June 2, 1925.

J. F. HOWERTON

NONSKID CHAIN

Original Filed April 9, 1921

1,540,130

Inventor
Jeter F. Howerton

Patented June 2, 1925.

1,540,130

UNITED STATES PATENT OFFICE.

JETER F. HOWERTON, OF GRAND RAPIDS, MICHIGAN.

NONSKID CHAIN.

Application filed April 9, 1921, Serial No. 459,923. Renewed February 18, 1925.

*To all whom it may concern:*

Be it known that I, JETER F. HOWERTON, residing at Grand Rapids, in the county of Kent and State of Michigan, a citizen of the United States, have invented certain new and useful Improvements in Nonskid Chains, of which the following is a specification.

My invention relates to an improvement in nonskid chains for automobile wheels.

The present invention is designed more particularly for heavy wheels, and is another form of the invention set forth in application Serial No. 451,715, filed March 12, 1921.

The present invention consists in an X-shaped connection between the inner and outer lateral chains, with double-heart-shaped links at the centers, where the major portion of the tread comes.

Figure 1:
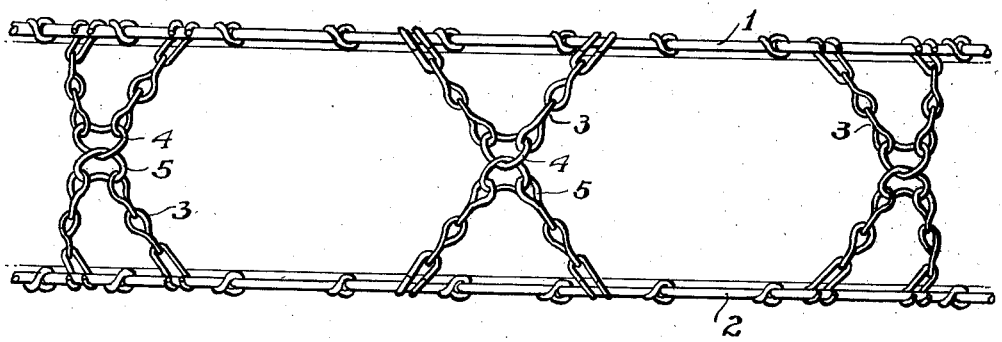
Fig. 1 is a fragmentary plan view showing my improvement applied.
Figure 2:
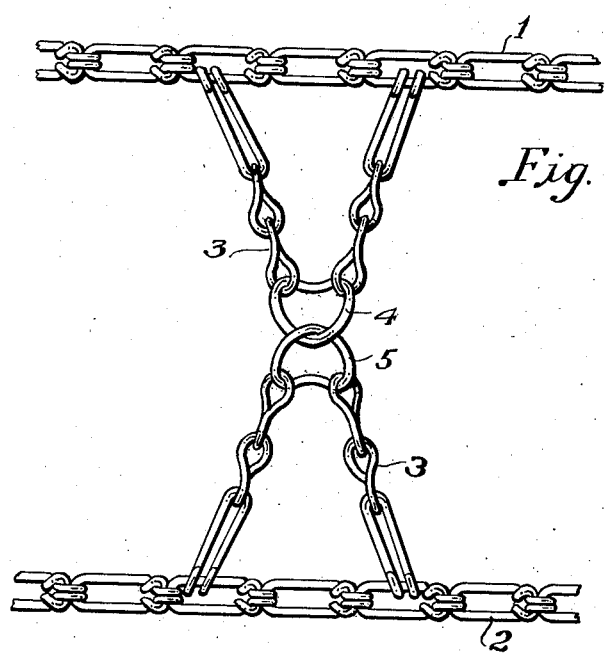
Fig. 2 is a fragmentary view of the chains stretched out flat.

The numerals 1 and 2 represent the inner and outer side or lateral chains, and the numeral 3 indicates the connecting cross-chains. These are in the general form of the letter X arranged at intervals and connected at the center by two double heart-shaped links 4 and 5.

These heart-shaped links preferably come at approximately the center of the tread, whereas the diverging ends are toward the sides or edges, where they prevent the car or truck from sliding sidewise or skidding, these links 4 and 5 effectually hold the wheel in its position through the effort of the widening prongs of the cross-chains on the outer members which diverge from the heart-shaped links at the center, thereby absolutely preventing skidding either when the wheel is turning or is locked by the brakes.

Obviously a single link might be used at the center, although the double heart-shaped connection is preferred.

I claim:

1. A non-skid tire chain comprising side chains, a plurality of cross members, each member comprising interlinked symmetrically arranged heart-shaped links at the center and short chains connected with the outer lobes of each heart-shaped link and connected with an adjacent side chain.

2. A non-skid tire chain, comprising side chains, a plurality of chain links approximately heart-shaped, each pair thereof being interlinked, and two short chains leading from the outer lobes of each heart-shaped link and connected with one of the side chains.

In testimony whereof I hereunto affix my signature.

JETER F. HOWERTON.